Aug. 7, 1928.
H. A. SCHWAGER
1,679,991
EXTERNAL CONTRACTING BRAKE
Filed Feb. 5, 1927
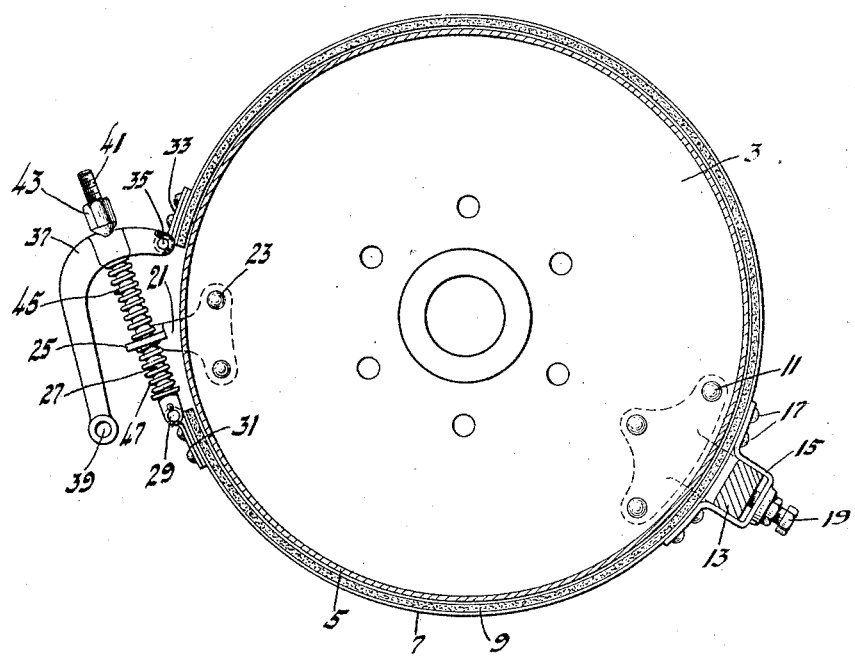
Inventor
Henry A. Schwager
By Blackmore, Spencer & Hiuh
Attorneys Patented Aug. 7, 1928.

1,679,991

UNITED STATES PATENT OFFICE.

HENRY A. SCHWAGER, OF ROYAL OAK, MICHIGAN, ASSIGNOR TO GENERAL MOTORS CORPORATION, OF DETROIT, MICHIGAN, A CORPORATION OF DELAWARE.

EXTERNAL CONTRACTING BRAKE.

Application filed February 5, 1927. Serial No. 166,234.

This invention relates to brakes; to the type of brake employing a band and a drum, there being a relative rotation between these two parts. The improved brake has been designed particularly for vehicles and may be used upon a vehicle wheel or some other rotating part, as for example on the propeller shaft. The invention however is not limited to vehicles and may be advantageously employed where ever a band brake is found to be of use.

The object of the invention is to make an improved band brake wherein the band sections wear uniformly over the entire periphery and wherein the clearance is at all times uniform. Other objects and advantages will be understood after reading the following specification. Accompanying the specification is a drawing illustrating what is now believed to be the preferred form of the invention.

The single figure shown in the drawing is a side elevation of an external contracting brake embodying my invention.

Referring by reference characters to the drawing, numeral 3 represents a fixed plate. This plate, in the case of a vehicle brake, may be the dust guard carried on the vehicle axle. Numeral 5 represents the drum which may be mounted on the vehicle wheel. Surrounding the drum is a brake band 7, having the usual brake lining 9. To the fixed plate is fastened at 11 an anchor 13. This anchor is straddled by a U-shaped member 15 fastened by rivets 17 to the brake band 7. Suitable adjusting means are shown at 19.

Between the adjacent ends of the band is a guide 21 secured to the fixed plate by fastening means 23. The guide 21 has an apertured projection 25 through which passes a rod 27. The rod 27 is pivoted at 29 to a fitting 31 carried by one end of the brake band. A similar fitting 33 is riveted to the other end of the band and to this fitting is pivoted at 35 one end of a conventional operating lever 37. The other end of the operating lever is apertured as at 39 or otherwise formed for attachment to an operating rod not shown. The lever 37 is apertured at an intermediate point and through aperture the rod 27 extends. The outer end of the rod 27 is threaded as shown at 41 and upon this threaded end is adjustably secured a nut 43 engaging lever 37. Surrounding rod 27 are two springs 45 and 47 these two springs having their adjacent ends in abutment with opposite faces with projection 25. The remote end of spring 47 engages a suitable seat on rod 27. The remote end of spring 45 is seated against lever 37 on the side of the latter opposite that engaged by nut 43.

From the construction described it will be understood that the action of the lever 37 and the springs 45 and 47 applies the two sections of the brake band to the drum through the agency of the coil springs which are so equalized that the tension upon both is the same. If the two springs are of the same length the brake would operate satisfactorily provided the band sections, the parts on each side of the anchor, were equal. It is common practice however to locate the anchor off centre so that the longer part of the band is self-actuating in the forward direction of travel. It should be kept in mind that equal pressures on springs of equal length will compress the springs to equal extents. It will then be clear that with such equal springs the movement of the two ends of the band will be the same and the longer band would not be drawn so closely about the drum as the shorter band for a given pedal pressure. It is known, however, that in the case of several springs the deflection for a given load is proportional to the number of coils. If therefore, springs 45 and 47 be given a number of coils proportional to the length of the respective sections of the brake band a given force applied to the brake will deflect the springs to unequal extents and in each case the extent of the deflection will be proportional to the length of the band sections, and will also be proportional of course to the extent of movement of the ends of the band toward each other. In this way it is possible in applying a brake having unequal sections to insure that each section shall be drawn about the drum in a way to maintain uniform clearance and thereby to secure uniform wear at all points of the lining.

This simple expedient thus accomplishes the purpose of maintaining uniform clearance and insuring uniform wear of the lining. It avoids the necessity of providing a floating abutment for the adjacent ends of the springs and separate adjusting means for the two springs.

I claim:

1. In a brake, a drum, a band for frictional engagement with said drum, an intermediate anchor dividing the band into unequal sections, means including a lever for applying the sections of the band to the drum and springs associated with said lever to release said band, the deflections of the springs under equal load being in the same ratio as the lengths of the band section.

2. In a band brake, a drum, a band, an anchor dividing the band into unequal sections, a lever for applying the band sections to the drum, coil springs associated with said lever to release the band, the number of coils in the coil springs being in the same ratio as the lengths of the band sections.

3. In a brake, a drum, a band having unequal sections, a fixed guide between the adjacent ends of the band, a lever pivoted to one of said adjacent ends, a rod pivoted to the other adjacent end, said lever having a part movable on said rod, a spring between said guide and one end of said band, another spring between said guide and said lever, means on said rod to adjustably engage said lever under the action of said second spring, the lengths of the two springs being proportional to the lengths of the two sections of the band while under equal pressure.

4. In a brake, a drum, a brake member for frictional engagement with said drum, said brake member being constituted by parts of unequal length, anchoring means for said brake member, means including a lever for applying the parts of brake member to the drum, and springs associated with said lever to release said brake member, the deflections of the springs under equal loads being in the same ratio as the lengths of the parts of the brake member.

In testimony whereof I affix my signature.

HENRY A. SCHWAGER.